(12) United States Patent
Harrison

(10) Patent No.: US 7,731,026 B2
(45) Date of Patent: Jun. 8, 2010

(54) INSERT FOR TRUCK BOX

(75) Inventor: Craig Maurice Harrison, Gulf Breeze, FL (US)

(73) Assignee: Daws Manufacturing Co., Inc., Pensacola, FL (US)

( * ) Notice: Subject to any disclaimer, the term of this patent is extended or adjusted under 35 U.S.C. 154(b) by 0 days.

(21) Appl. No.: 12/203,947

(22) Filed: Sep. 4, 2008

(65) Prior Publication Data

US 2010/0052490 A1 Mar. 4, 2010

(51) Int. Cl.
*A45C 11/26* (2006.01)
*B60R 7/00* (2006.01)

(52) U.S. Cl. .................. 206/349; 224/402; 224/404

(58) Field of Classification Search ............. 312/348.3; 296/37.6; 224/404, 402; 220/532–533, 527–529, 220/23.89, 23.87; 211/172, 70.6, 133.6, 211/126.1, 10; 206/373, 349

See application file for complete search history.

(56) References Cited

U.S. PATENT DOCUMENTS

| | | | |
|---|---|---|---|
| 2,978,153 A | 4/1961 | T.H. Brindle | |
| 3,729,242 A * | 4/1973 | Barney | 312/348.3 |
| 4,131,203 A | 12/1978 | Bridges | |
| 4,215,896 A | 8/1980 | Drouin | |
| 4,283,083 A | 8/1981 | Johnson | |
| 4,288,011 A | 9/1981 | Grossman | |
| 4,469,364 A | 9/1984 | Rafi-Zadeh | |
| 4,488,669 A | 12/1984 | Waters | |
| 4,844,305 A * | 7/1989 | McKneely | 224/404 |
| 4,848,626 A | 7/1989 | Waters | |
| 4,889,377 A | 12/1989 | Hughes | |
| D305,315 S | 1/1990 | Fletcher | |
| 5,088,636 A | 2/1992 | Barajas | |
| 5,094,375 A | 3/1992 | Wright | |
| 5,299,722 A | 4/1994 | Cheney | |
| 5,316,358 A | 5/1994 | Payne et al. | |
| 5,381,940 A | 1/1995 | Wright | |
| 5,398,987 A | 3/1995 | Sturgis | |
| 5,588,631 A * | 12/1996 | Yee | 224/404 |
| 5,601,206 A | 2/1997 | Haas et al. | |
| 5,634,577 A | 6/1997 | Pearson, Jr. et al. | |
| 5,857,757 A * | 1/1999 | Bieker et al. | 206/373 |
| 5,988,473 A | 11/1999 | Hagan et al. | |
| 6,138,883 A * | 10/2000 | Jackson et al. | 296/37.6 |
| 6,189,945 B1 | 2/2001 | Rockett | |
| 6,203,087 B1 | 3/2001 | Lance et al. | |
| 6,422,629 B2 | 7/2002 | Lance et al. | |
| 6,460,744 B2 | 10/2002 | Lance et al. | |
| 6,574,911 B1 | 6/2003 | Hurst et al. | |
| 6,634,691 B2 | 10/2003 | Henderson | |
| 6,695,375 B1 | 2/2004 | May | |
| 6,874,667 B2 | 4/2005 | Dykstra et al. | |

* cited by examiner

*Primary Examiner*—Ehud Gartenberg
*Assistant Examiner*—Kaushikkumar Desai
(74) *Attorney, Agent, or Firm*—GrayRobinson, P.A.

(57) ABSTRACT

An insert is provided for the hollow interior of a trick tool box including one or more rails having mounting structure for supporting bins, trays, tool racks, tool holders, hooks, pegs and other means for storing items within the box interior.

27 Claims, 6 Drawing Sheets

INSERT FOR TRUCK BOX

FIELD OF THE INVENTION

This invention relates to truck tool boxes, and, more particularly, to inserts for truck tool boxes that mount bins, trays, tool holders and other objects within the interior of the box.

BACKGROUND OF THE INVENTION

One of the most popular accessories for trucks and recreational vehicles is a truck box used to store and secure a variety of tools and other items in the bed of the vehicles. There are a number of different types of truck boxes, including cross-over boxes, side mount boxes, chest boxes, top mount boxes, RV boxes and others. Each truck box is typically formed of aluminum tread plate, and comprises a front wall, a back wall, a bottom wall and opposed end walls which are interconnected to define a hollow interior. The truck box interior is closed by a top lid that is pivotal on one or more hinges, usually with the assistance of gas springs. In many truck box designs, latch mechanisms connected by an operating rod are provided to maintain the top lid in a closed and locked position to secure the contents of the box. The latch mechanisms and operating rod may be protected from damage by a rail located along the front wall of the box.

Depending upon the types of tools or other items to be stored in the box, it is advantageous to provide separate storage areas within the box interior. This has been achieved in past designs by providing the box with drawers, shelves, compartments defined by vertically extending panels and similar structures. Drawers and shelves typically extend across the entire width of the box, e.g. from the front wall to the back wall, and may also span the length of the box between the opposed end walls. The compartments noted above may be formed by inserting panels into vertical slots formed in the front and back walls of the box, such as shown in U.S. Pat. No. 6,634,691, but like the drawers and shelves such compartments extend all the way across the width of the box. Very little flexibility is provided in the way interior space within the box may be arranged in such designs, which can create difficulties for those who have different types and sizes of items to be stored.

SUMMARY OF THE INVENTION

This invention is directed to inserts for the hollow interior of a truck tool box defined by a front wall, a back wall, a bottom wall, opposed end walls and a pivotal top lid. The inserts include at least one rail having a variety of means for mounting objects such as bins, trays, tools and other objects within the box interior.

In one presently preferred embodiment, the insert of this invention may comprise a one-piece stamped and bended assembly, having opposed first and second side plates connected by a bottom plate. The first side plate is mounted to the front wall of the truck box, and the second side plate is mounted to the back wall. The first and second side plates preferably extend along the entire length of the truck box between its opposed end walls. Each side plate includes a rail formed with an array of holes similar to those of a peg board, a number of keyholes, slots and/or other types of openings, a number of pegs and/or hooks extending outwardly from the surface thereof and similar mounting structure capable of supporting bins, containers, tool racks, tool holders and similar means for storing items within the box interior. Each of the rails may also be formed with a seat at its lower end. The rails face one another within the box interior so that a tray may be inserted into the facing seats of the rails to support items therein, and to slide such items with the tray from one end of the box to the other.

In an alternative embodiment of the insert of this invention, the bottom plate of the insert described above is removed and the side plates are provided as separate structures. One or both of the side plates may be employed and mounted to respective front and back walls of the truck box. Each of the side plates has a rail, as discussed above, for supporting items within the box interior.

The truck box may also be provided with an insert located along one or both of its end walls, and extending across the width of the box between its front and back walls. These end inserts may have the same construction as the inserts located along the front and back walls, including mounting structure capable of supporting bins, containers, tool racks, tool holders and similar means for storing items within the box interior.

The inserts of this invention provide for a great deal of flexibility in configuring the interior of a truck box to accommodate different types and sizes of items to be stored. Bins, tool holders, trays, hooks, pegs and other mounting structures of different sizes may be mounted to the rail of the inserts in any desired location along the length and/or width of the truck box, and they may be removed in the event other items need to be stored. Smaller items, such as nails, screws and other fasteners may be contained within a bin, for example, and larger items such as hand tools, power tools, extension cords, etc. may be stored on a peg or hook carried by a rail or in the main portion of the box interior to provide easy access to both types of items. The bins may be removed from the box at a job site, and then mounted back in place on a side wall, as desired. Such flexibility in the storage capability of the tool box of this invention is advantageous compared to the prior art.

BRIEF DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE INVENTION

Figure 1:
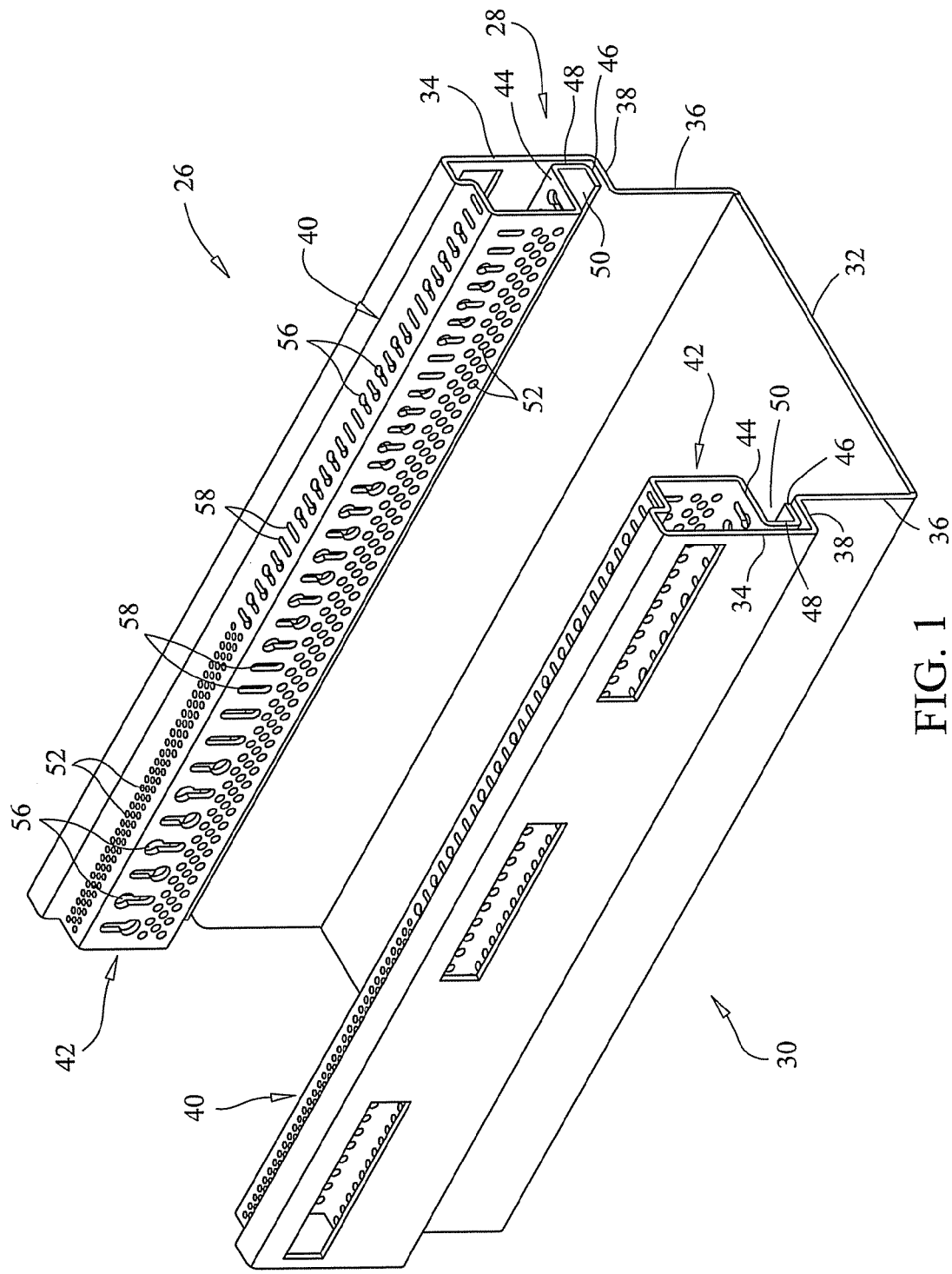
FIG. 1 is a perspective view of one embodiment of the insert of this invention.
Figure 2:
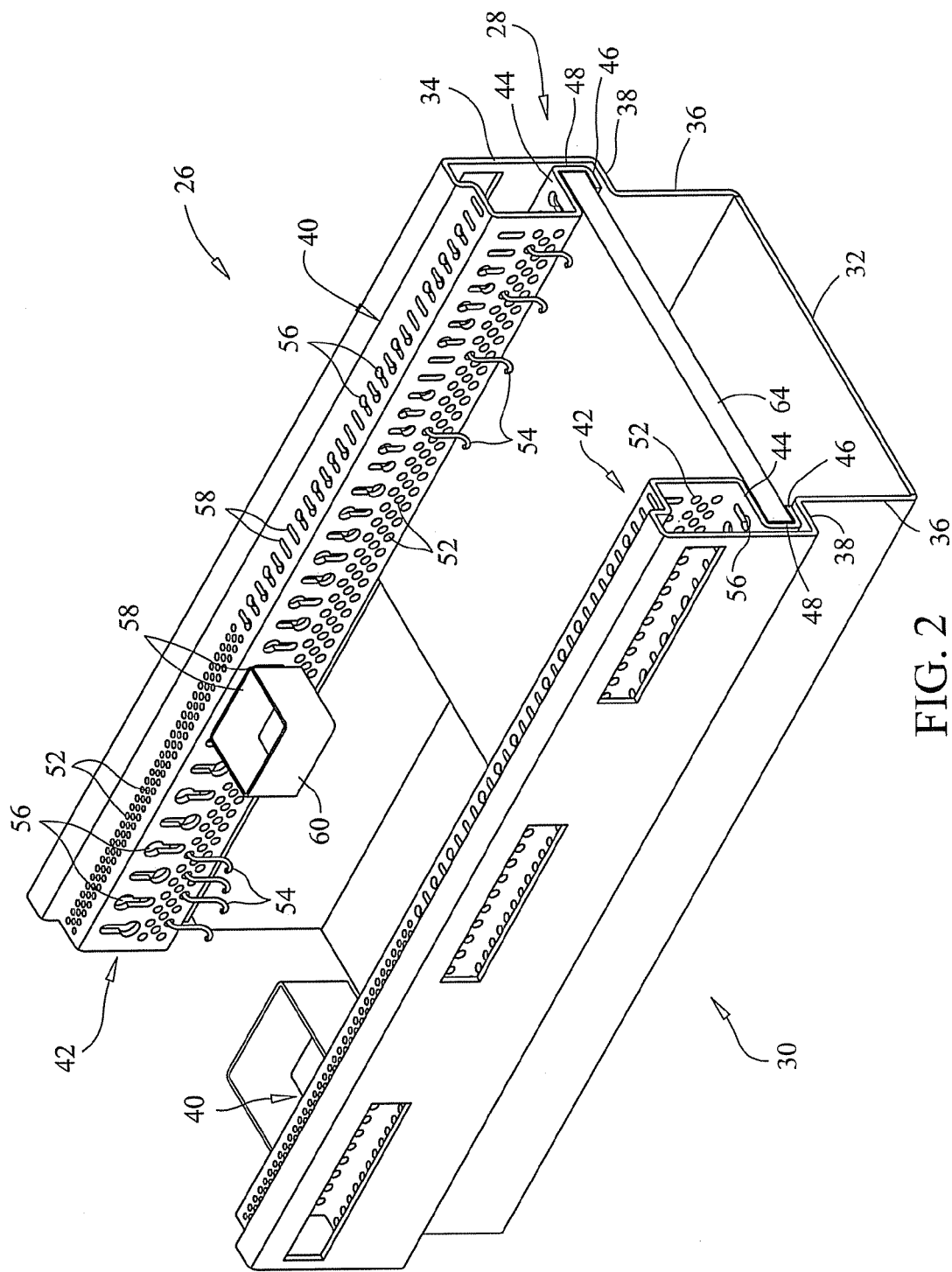
FIG. 2 is view similar to FIG. 1 except showing a number of structures for mounting items to the insert herein.
Figure 3:
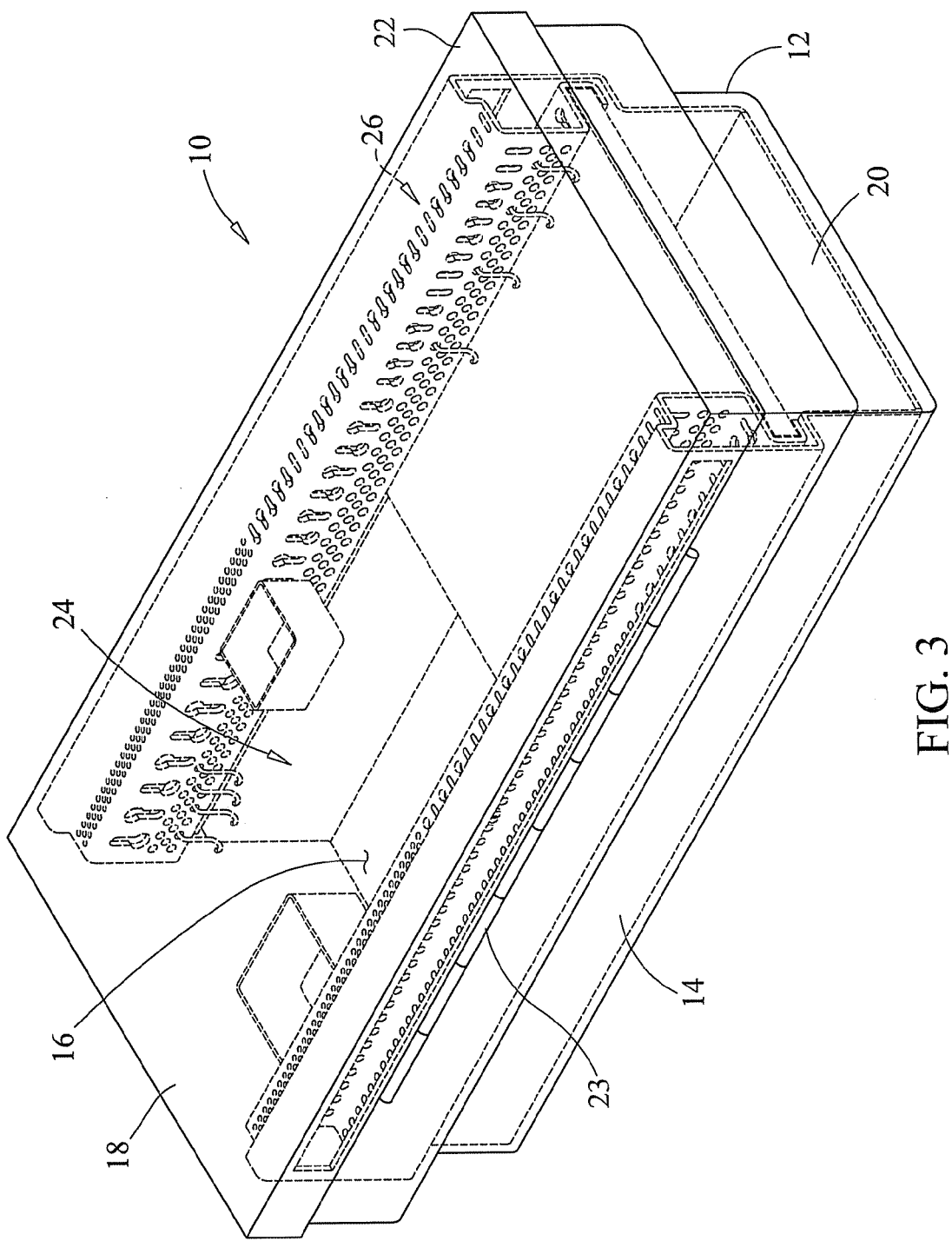
FIG. 3 is a perspective view of the insert of FIGS. 1 and 2 in position within the interior of a truck box.

Referring initially to FIGS. 1-3 and 5, a truck tool box 10 is schematically depicted which comprises a front wall 12, a back wall 14, a bottom wall 16, opposed end walls 18 and 20, and, a top lid 22 pivotally mounted to the back wall 14 by a hinge 23. The walls 12-20 are interconnected to form a hollow interior 24 within which inserts according to this invention are located, as described in detail below. It should be understood that the particular configuration of the tool box 10 shown in FIG. 3 is intended for purposes of illustration only, and various other types of truck tool boxes such as side mount boxes, chest boxes, top mount boxes, RV boxes and others could be employed with the inserts herein and are considered within the scope of this invention. For purposes of the present discussion, terms "front," "rear," "top," "bottom," "upwardly," "downwardly," "inwardly," "outwardly" and the like refer to the orientation of the truck tool box 10 as viewed in FIG. 3.

One embodiment of an insert 26 according to this invention is depicted in FIGS. 1 and 2. The insert 26 may be formed of a single section of a suitable metal such as aluminum which is stamped or punched and then undergoes a series of bending operations to assume the shape shown in the Figs. Alternatively, the insert 26 may be formed of plastic, such as by injection molding, or other materials including wood, steel and the like. The insert 26 comprises a first side plate 28 and a second side plate 30 connected by a bottom plate 32. The insert 26 is located within the interior 24 of the box 10 in position for mounting the first side plate 28 to the front wall 12 and the second side plate 30 to the back wall 14, with the bottom plate 32 extending along the bottom wall 16 of the box 10. As shown in FIG. 3, the length of the insert 26 is such that it preferably extends between the end walls 18 and 20 of the box 10.

In order to fit against the front and back walls 12, 14 of the box 10, the first and second side plates 28, 30 have a stepped configuration. Each of the side plates 28, 30 has an upper section 34 and a lower section 36 connected by a horizontally extending step 38. The upper section 34 may be formed with openings 35 to avoid interference with latches (not shown) and/or with other structure within the box 10. A stepped top plate 40 is joined to the upper section 34, and the bottom plate 32 of the insert 26 is joined to the lower section 36. The top plate 40 has an inner edge joined to a vertically extending rail 42. The rail 42, in turn, is joined to a generally U-shaped structure formed by an upper leg 44 and a lower leg 46 separated by a connector plate 48. The space between the horizontally extending legs 44 and 46 defines a seat 50 that extends from one end wall 18 of the box 10 to the other end wall 20.

In the presently preferred embodiment, the rail 42 of each side plate 28 and 30 is capable of supporting a variety of containers, supports, racks and other supports for tools and other items. The mounting structure of each rail 42 may include an array of holes 52 similar to those found on a peg board for supporting hooks 54 and essentially any other tool holder or the like that is typically mounted to a peg board, and keyholes 56, slots 58 and other openings, preferably at least some of which differ in size and shape, to mount bins 60, tool racks, containers or other supports (not shown) within the interior 24 of the box 10. Any one of the holes 52, keyholes 56 and slots 58 may mount a peg (not shown) or similar support, or, alternatively, such pegs or supports may be permanently affixed to the rail 42. As seen in FIGS. 1 and 2, the first and second side plates 28, 30 face one another and their respective seats 50 align. A tray 64 may be carried between the aligning seats 50, and moveable from end-to-end between the end walls 18, 20 of the box 10, to provide an additional structure for supporting items with the box interior 24. It is contemplated that the bins 60, tray 64, tool racks, containers and other supports carried by the insert 26 may be formed of metal, plastic, wood or any other suitable material.

Although it is contemplated that the rail 42 of each side plate 28 and 30 of insert 26 will provide the majority of the mounting structure for the support of items within the box interior 24, the top plate 40 and lower leg 46 of side plates 28 and 30 may also be formed with holes 52, keyholes 56 and/or slots 58 to provide additional locations for the support of items. See FIGS. 2 and 5.

Figure 4:
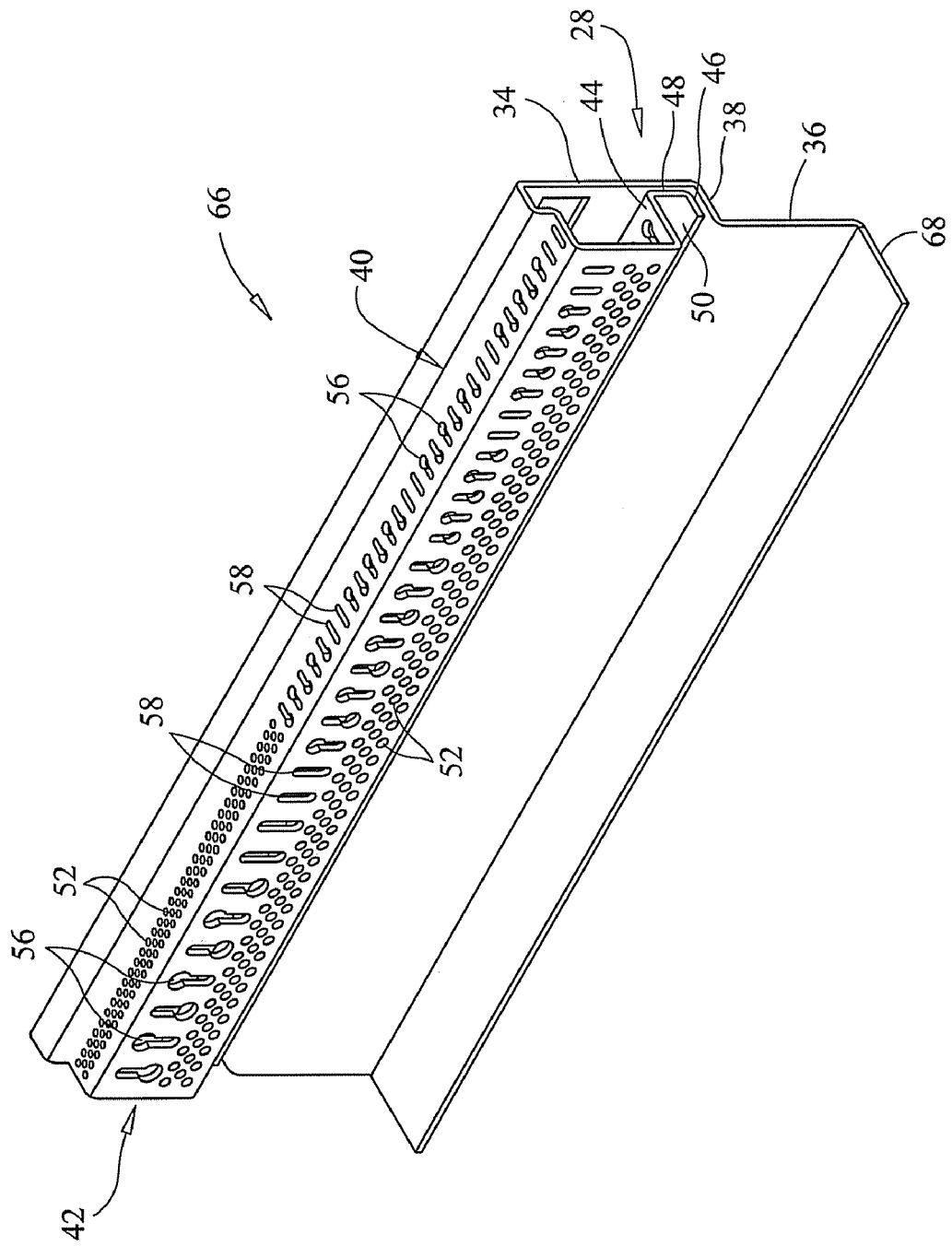
FIG. 4 is a perspective view of an alternative embodiment of the insert of this invention.
Figure 5:
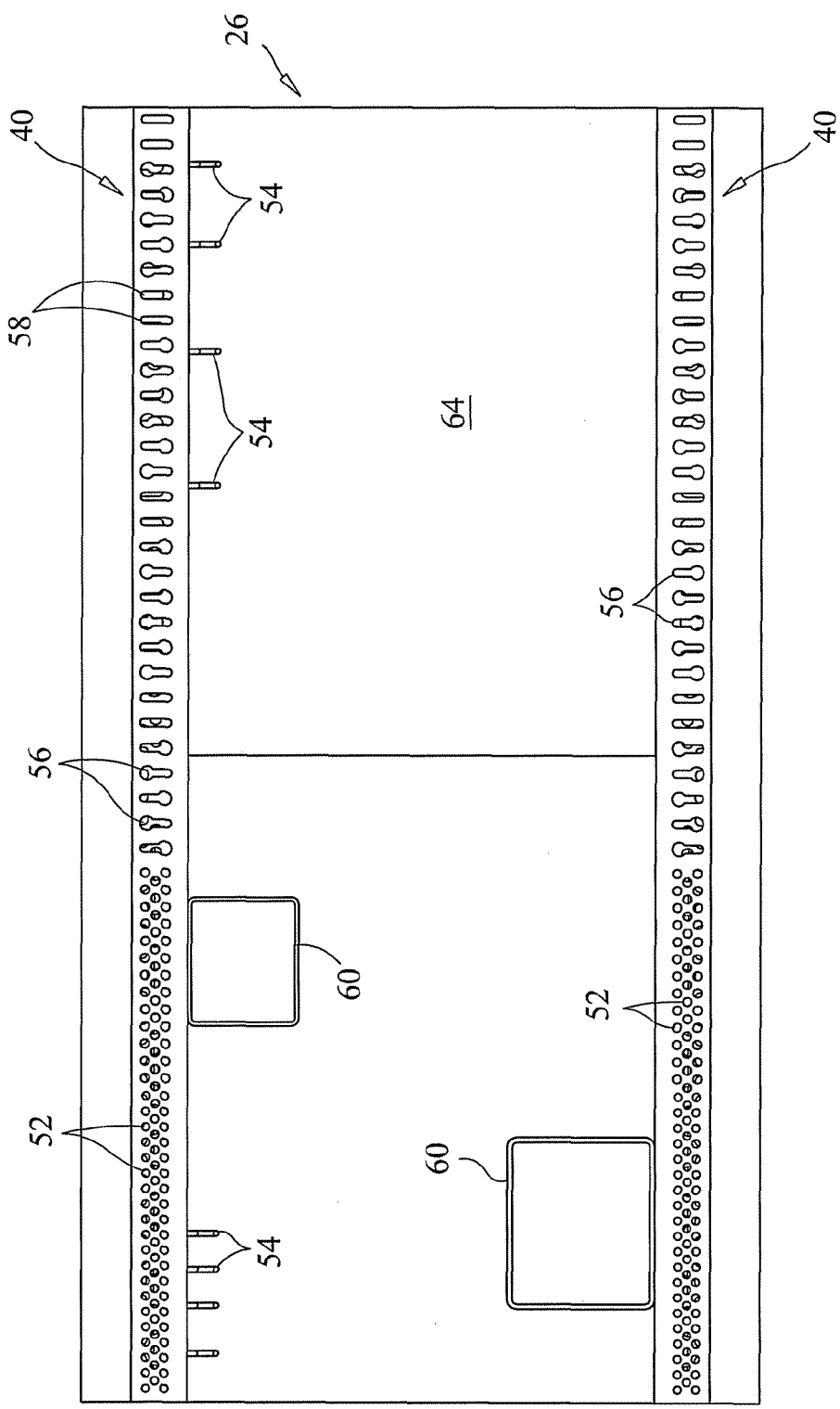
FIG. 5 is a top plan view of the insert as shown in FIG. 2.

Referring now to FIG. 4, an alternative embodiment of an insert 66 according to this invention is shown. The insert 66 is preferably formed in a one-piece construction from a section of metal such as aluminum which is stamped or punched and then undergoes a series of bending operations to assume the shape depicted in FIG. 4. Alternatively, the insert 66 may be formed of plastic, such as by injection molding, or other materials including wood, steel and the like. The insert 66 is similar to each of the first and second side plates 28 and 30 of insert 26, and the same reference numbers are therefore used to denote common structure. The primary difference between inserts 26 and 66 is that with insert 66 the bottom plate 32 is removed, except for a short extension 68 joined with the lower section 36, and only one of the side plates 28 or 30 can be employed if desired, instead of both of them. The insert 66 may be mounted to the front wall 12 or to the back wall 14 of the box 10, but not both. Alternatively, two inserts 66 may be used with one mounted to each of the front and back walls 14, 16 to provide additional structure for mounting items with the box interior 24, and to permit the use of a tray 64 extending between the seats 50, as described above. Otherwise, the structure and operation of the insert 66 is the same as that discussed above in connection with insert 26.

Figure 6:
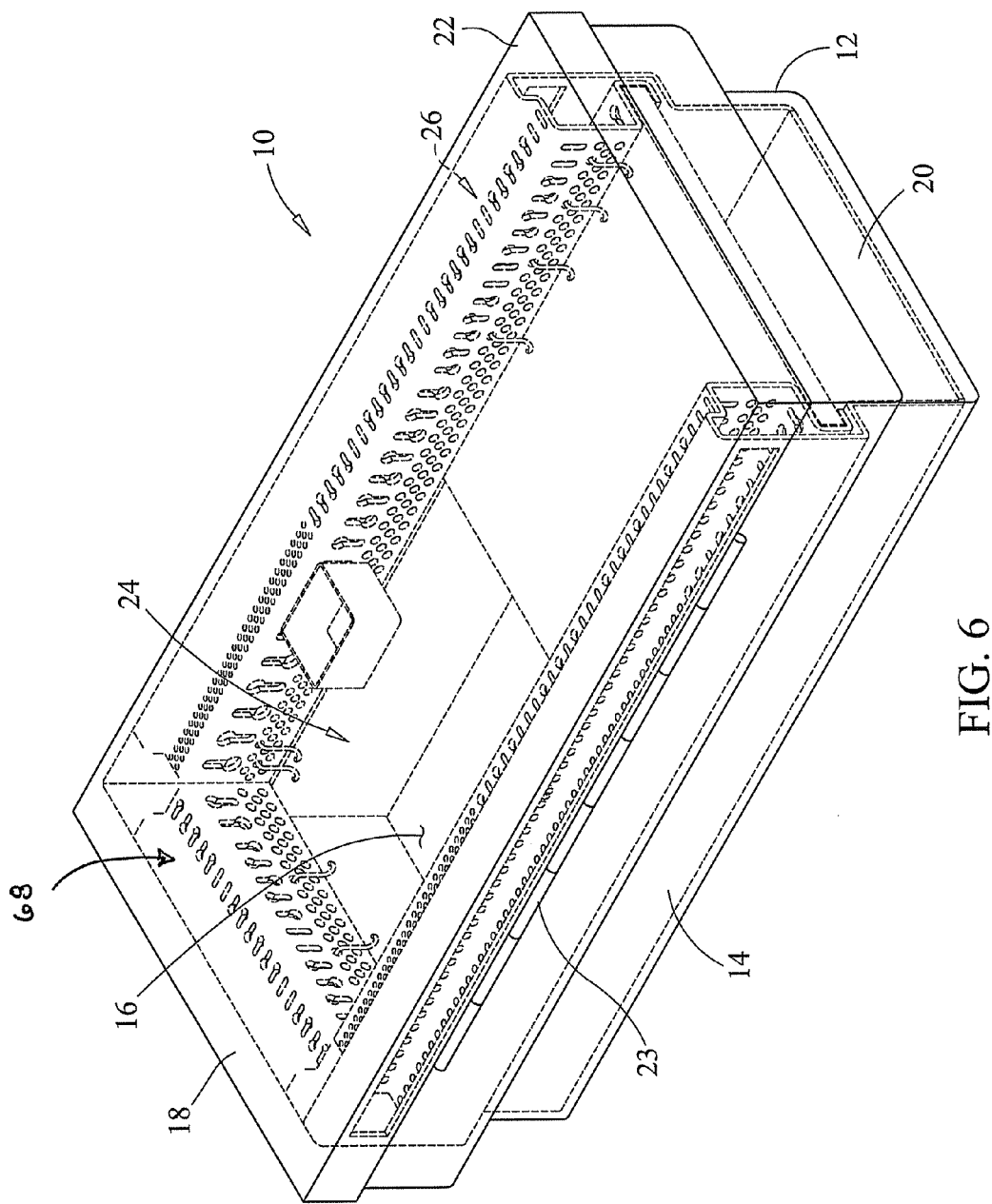
FIG. 6 is a view similar to FIG. 3 except including an insert located at one of the end walls of the truck box.

A still further embodiment of this invention is shown in FIG. 6. An end wall insert 68 is illustrated which is mounted to the end wall 18 of the truck box 10 and extends across its width between the front wall 12 and back wall 14. A second end wall insert (not shown) may be mounted to the end wall 20 of box 10, if desired. The insert 68 has the same construction as the insert 66 shown in FIG. 4, and described above.

The inserts 26, 66 and 68 provide substantial flexibility in configuring the storage area within the box interior 24 compared to the prior art. The structures for supporting or housing items to be stored, such as hooks 54, bins 60, tool racks, containers or other supports may be located in any position along the rail 42, and different sizes and numbers of such supports may be employed, as desired. Supports such as bins 60 and other containers may be detached from the rail 42 and removed from the box 10 at a job site for ready access where needed, and then re-attached for storage when not in use. The hooks 54 and pegs may also be readily detached and repositioned along the rails 42, or removed, at any time. The tray 64 may take the form of a flat section of wood, plastic, metal or other material, as shown in FIGS. 2 and 3, or it may be formed in the shape of a tray or bin 60. Further, the length of the tray 64 as measured in a direction between the end walls 18, 20, may be varied, or, alternatively, the tray 64 may be eliminated altogether. Any of the supports connected to the mounting structures of the rails 42 may be used to store a variety of items with the box interior 42, e.g. hand tools, power tools, nails, screws, bolts etc.

While the invention has been described with reference to a preferred embodiment, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A truck box, comprising:
   a front wall, a back wall, a bottom wall, opposed end walls and a top lid interconnected to form a hollow interior;
   an insert located within said hollow interior, said insert comprising:
   (i) a first side plate connected to said front wall;
   (ii) a first rail joined to said first side plate by a first plate, said first rail being spaced from said front wall in a direction toward said back wall, said first rail being formed with mounting structure which releasably secures at least one first support, said at least one first support being effective to store items within said hollow interior;
   (iii) a second side plate connected to said back wall; and
   (iv) a second rail joined to said second side plate by a second plate, said second rail being spaced from said back wall in a direction toward said front wall, said second rail being formed with mounting structure which releasably secures at least one second support, said at least one second support being effective to store items within said hollow interior.

2. The truck box of claim 1 in which each of said first and second side plates includes an upper section and a lower section connected by a step.

3. The truck box of claim 1, in which each of said first and second plate is formed with mounting structure.

4. The truck box of claim 1 in which said second side plate is joined to said second rail by a top plate, said second rail being spaced from said back wall in a direction toward said front wall.

5. The truck box of claim 1 in which said first side plate and said second side plate are connected by a bottom plate, said bottom plate extending along said bottom wall between said front wall and said back wall and between said opposed end walls.

6. The truck box of claim 5 in which said first side plate, said second side plate and said bottom plate are formed in a one-piece construction.

7. The truck box of claim 1 in which said mounting structure of each of said first and second rails includes a number of key holes.

8. The truck box of claim 1 in which said mounting structure of each of said first and second rails includes a number of mounting bores.

9. The truck box of claim 1 in which said mounting structure of each of said first and second rails includes a number of slots.

10. The truck box of claim 1 further including an upper leg joined to each of said first and second rails, a lower leg spaced from said upper leg and a connector plate extending between said upper and lower legs to form respective first and second seats, said first and second seats aligning with one another to receive and support a tray between them.

11. A truck box, comprising:
    a front wall, a back wall, a bottom wall, opposed end walls and a top lid interconnected to form a hollow interior;
    a one-piece insert located within said hollow interior, said one-piece insert comprising:
    (i) a first side plate, a second side plate and a bottom plate connected between said first and second side plates;
    (ii) a first rail joined to said first side plate by a first plate, said first rail being spaced from said front wall in a direction toward said back wall, said first rail being formed with mounting structure which releasably secures at least one first support, said at least one first support being effective to store items within said hollow interior;
    (iii) a second rail joined to said second side plate by a second plate, said second rail being spaced from said back wall in a direction toward said front wall, said second rail being formed with mounting structure which releasably secures at least one second support, said at least one second support being effective to store items within said hollow interior.

12. The truck box of claim 11 in which said mounting structure of each of said first and second rails includes a number of key holes.

13. The truck box of claim 11 in which said mounting structure of each of said first and second rails includes a number of slots.

14. The truck box of claim 11 in which said mounting structure of each of said first and second rails includes a number of mounting bores.

15. The truck box of claim 11 further including an upper leg joined to each of said first and second rails, a lower leg spaced from said upper leg and a connector plate extending between said upper and lower legs to form respective first and second seats, said first and second seats facing one another to receive and support a tray between them.

16. The truck box of claim 11 in which said first side plate and said first rail are joined by a top plate, said top plate being formed with mounting structure.

17. The truck box of claim 11 in which said second side plate and said second rail are joined by a top plate, said top plate being formed with mounting structure.

18. A truck box, comprising:
    a front wall, a back wall, a bottom wall, opposed end walls and a top lid interconnected to form a hollow interior;
    an insert located within said hollow interior, said insert including a side plate connected to one of said front wall and said back wall, and a rail joined to said side plate by a connector plate, said rail being spaced from said one of said front and back walls to which said side plate is connected in a direction toward the other of said front and back walls, said rail being formed with mounting structure which releasably secures at least one support, said at least one support being effective to store items within said hollow interior.

19. The truck box of claim 18 in which said mounting structure of said rail includes a number of key holes.

20. The truck box of claim 18 in which said mounting structure of said rail includes a number of slots.

21. The truck box of claim 18 in which said mounting structure of said rail includes a number of mounting bores.

22. A truck box, comprising:
    a front wall, a back wall, a bottom wall, opposed end walls and a top lid interconnected to form a hollow interior;
    at least one first insert located within said hollow interior, said at least one first insert having a first side plate connected to one of said front wall and said back wall, and a rail joined to said first side plate by a first plate, said rail being spaced from said one of said front and back walls to which said first side plate is connected in a direction toward the other of said front and back walls, said rail being formed with mounting structure which releasably secures at least one first support, said at least one first support being effective to store items within said hollow interior;
    at least one second insert located within said hollow interior, said at least one second insert having a second side plate connected to one of said opposed end walls and a rail joined to said second side plate by a second plate, said rail being spaced from said one of said opposed end walls to which said second side plate is connected in a direction toward the other of said opposed end walls, said rail being formed with mounting structure which releasably secures at least one first support, said at least one first support being effective to store items within said hollow interior.

23. The truck box of claim 22 in which said side plate of each of said at least one first insert and said at least one second insert is joined to said rail by a top plate.

24. The truck box of claim 23 in which each of said top plates is formed with mounting structure.

25. The truck box of claim 22 in which said mounting structure of said rail of each of said at least one first and second inserts includes a number of key holes.

26. The truck box of claim 22 in which said mounting structure of said rail of each of said at least one first and second inserts includes a number of slots.

27. The truck box of claim 22 in which said mounting structure of said rail of each of said at least one first and second inserts includes a number of mounting bores.

* * * * *